(12) United States Patent
Hall et al.

(10) Patent No.: US 7,123,160 B2
(45) Date of Patent: Oct. 17, 2006

(54) METHOD FOR TRIGGERING AN ACTION

(75) Inventors: David R. Hall, Provo, UT (US); David B. Bartholomew, Springville, UT (US); Monte L. Johnson, Orem, UT (US); Justin Moon, Bountiful, UT (US); Roger O. Koehler, Provo, UT (US)

(73) Assignee: IntelliServ, Inc., Provo, UT (US)

( * ) Notice: Subject to any disclaimer, the term of this patent is extended or adjusted under 35 U.S.C. 154(b) by 316 days.

(21) Appl. No.: 10/710,878

(22) Filed: Aug. 10, 2004

(65) Prior Publication Data

US 2005/0035876 A1 Feb. 17, 2005

Related U.S. Application Data

(63) Continuation-in-part of application No. 10/710,790, filed on Aug. 3, 2004.

(60) Provisional application No. 60/481,225, filed on Aug. 13, 2003.

(51) Int. Cl.
*G01V 3/00* (2006.01)
(52) U.S. Cl. .............................. 340/853.3; 340/853.1; 166/250.01
(58) Field of Classification Search ............ 340/854.6, 340/853.1, 853.3; 166/250.01
See application file for complete search history.

(56) References Cited

U.S. PATENT DOCUMENTS

| 2,414,719 | A | 1/1947 | Cloud |
| 3,518,608 | A | 6/1970 | Pepadopoulos |
| 4,281,403 | A | 7/1981 | Siems et al. |
| 4,471,435 | A | 9/1984 | Meisner |
| 4,739,325 | A | 4/1988 | MacLeod |
| 4,788,544 | A | 11/1988 | Howard |
| 5,558,153 | A | 9/1996 | Holcombe et al. |
| 6,012,015 | A | 1/2000 | Tubel |
| 6,252,518 | B1 | 6/2001 | Laborde |
| 6,349,766 | B1 | 2/2002 | Bussear et al. |
| 6,370,161 | B1 * | 4/2002 | Ehrlich et al. .............. 370/516 |
| 6,386,108 | B1 | 5/2002 | Brooks et al. |
| 6,392,317 | B1 | 5/2002 | Hall et al. |
| 6,424,595 | B1 * | 7/2002 | Chenin ........................ 367/82 |
| 6,594,284 | B1 | 7/2003 | Page et al. |
| 6,624,759 | B1 | 9/2003 | Tubel et al. |
| 6,670,880 | B1 | 12/2003 | Hall et al. |
| 6,688,396 | B1 | 2/2004 | Floerke et al. |

(Continued)

OTHER PUBLICATIONS

PCT/US03/18475, Published Dec. 4, 2003, Applicant Baker Hughes; International Search Report: "Documents Considered to Be Relevant".

*Primary Examiner*—Albert K. Wong
(74) *Attorney, Agent, or Firm*—Jeffery E. Daly; Tyson J. Wilde; Jonathon S. Barlow

(57) ABSTRACT

A method for triggering an action of at least one downhole device on a downhole network integrated into a downhole tool string synchronized to an event comprises determining latency, sending a latency adjusted signal, and performing the action. The latency is determined between a control device and the at least one downhole device. The latency adjusted signal for triggering an action is sent to the downhole device. The action is performed downhole synchronized to the event. A preferred method for determining latency comprises the steps: a control device sends a first signal to the downhole device; after receiving the signal, the downhole device sends a response signal to the control device; and the control device analyzes the time from sending the signal to receiving the response signal.

36 Claims, 4 Drawing Sheets

U.S. PATENT DOCUMENTS

| | | |
|---|---|---|
| 6,717,501 B1 | 4/2004 | Hall et al. |
| 6,799,632 B1 | 10/2004 | Hall et al. |
| 6,821,147 B1 | 11/2004 | Hall et al. |
| 6,826,123 B1 * | 11/2004 | Herring ........................ 368/46 |
| 6,830,467 B1 | 12/2004 | Hall et al. |
| 6,844,498 B1 | 1/2005 | Hall et al. |
| 6,866,306 B1 | 3/2005 | Boyle et al. |
| 6,888,473 B1 | 5/2005 | Hall et al. |
| 6,913,093 B1 | 7/2005 | Hall et al. |
| 6,929,493 B1 | 8/2005 | Hall et al. |
| 6,945,802 B1 | 9/2005 | Hall et al. |
| 6,968,611 B1 | 11/2005 | Hall et al. |
| 2004/0039466 A1 | 2/2004 | Lilly et al. |
| 2004/0104797 A1 | 6/2004 | Hall et al. |
| 2004/0113808 A1 | 6/2004 | Hall et al. |
| 2004/0146492 A1 | 7/2004 | Hall et al. |
| 2004/0150592 A1 | 8/2004 | Hall et al. |
| 2004/0164833 A1 | 8/2004 | Hall et al. |
| 2004/0164838 A1 | 8/2004 | Hall et al. |
| 2004/0216647 A1 | 11/2004 | Hall et al. |
| 2004/0244916 A1 | 12/2004 | Hall et al. |
| 2004/0244964 A1 | 12/2004 | Hall et al. |
| 2004/0246142 A1 | 12/2004 | Hall et al. |
| 2005/0001735 A1 | 1/2005 | Hall et al. |
| 2005/0001736 A1 | 1/2005 | Hall et al. |
| 2005/0001738 A1 | 1/2005 | Hall et al. |
| 2005/0035874 A1 | 2/2005 | Hall et al. |
| 2005/0035875 A1 | 2/2005 | Hall et al. |
| 2005/0035876 A1 | 2/2005 | Hall et al. |
| 2005/0036607 A1 | 2/2005 | Hall et al. |
| 2005/0039912 A1 | 2/2005 | Hall et al. |
| 2005/0046338 A1 | 3/2005 | Hall et al. |
| 2005/0046586 A1 | 3/2005 | Hall et al. |
| 2005/0046590 A1 | 3/2005 | Hall et al. |
| 2005/0067159 A1 | 3/2005 | Hall et al. |
| 2005/0070144 A1 | 3/2005 | Hall et al. |
| 2005/0082092 A1 | 4/2005 | Hall et al. |
| 2005/0092499 A1 | 5/2005 | Hall et al. |
| 2005/0093296 A1 | 5/2005 | Hall et al. |
| 2005/0095827 A1 | 5/2005 | Hall et al. |
| 2005/0115717 A1 | 6/2005 | Hall et al. |
| 2005/0145406 A1 | 7/2005 | Hall et al. |
| 2005/0150653 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0236160 A1 | 10/2005 | Hall et al. |
| 2005/0279508 A1 | 12/2005 | Hall et al. |
| 2005/0284659 A1 | 12/2005 | Hall et al. |
| 2005/0284662 A1 | 12/2005 | Hall et al. |
| 2005/0284663 A1 | 12/2005 | Hall et al. |
| 2005/0285646 A1 | 12/2005 | Hall et al. |
| 2005/0285705 A1 | 12/2005 | Hall et al. |
| 2005/0285706 A1 | 12/2005 | Hall et al. |
| 2005/0285751 A1 | 12/2005 | Hall et al. |
| 2005/0285752 A1 | 12/2005 | Hall et al. |
| 2005/0285784 A1 | 12/2005 | Hall et al. |

* cited by examiner

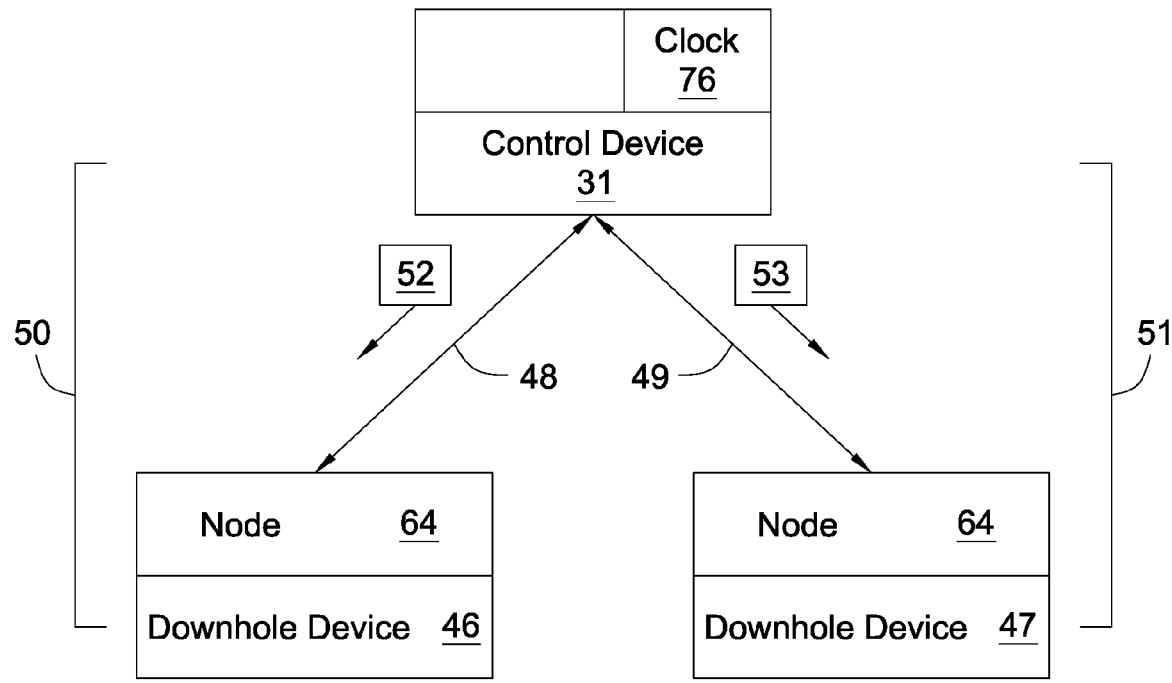
Fig. 5
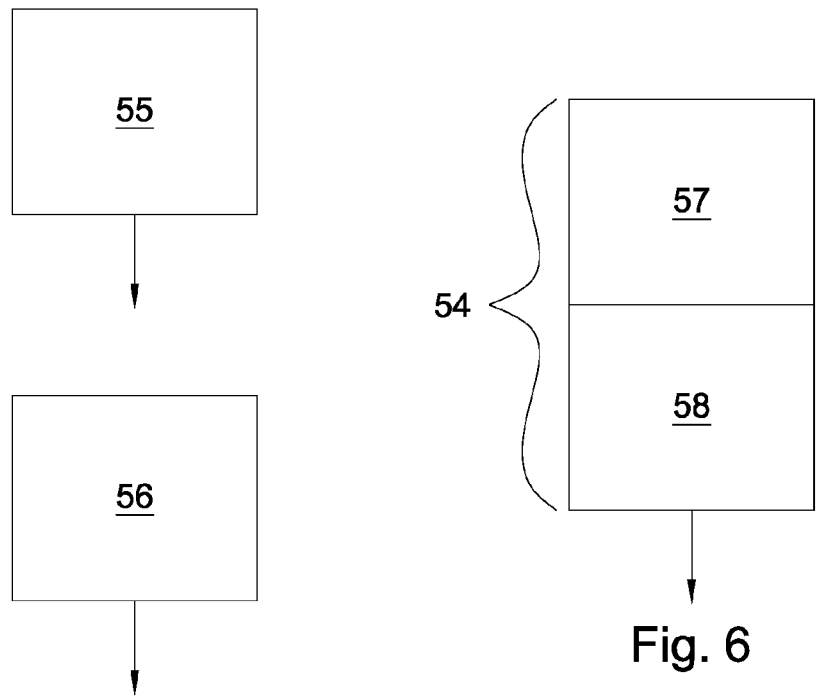
Fig. 6
Fig. 7

METHOD FOR TRIGGERING AN ACTION

CROSS REFERENCE TO RELATED APPLICATIONS

The present application is a continuation-in-part of co-pending U.S. patent application Ser. No. 10/710,790 filed on Aug. 3, 2004, which is herein incorporated by reference. Said application, Ser. No. 10/710,790 claims priority of now abandoned U.S. Provisional Patent Application Ser. No. 60/481,225 filed Aug. 13, 2003, which is herein incorporated by reference.

FEDERAL RESEARCH STATEMENT

This invention was made with government support under Contract No. DE-FC26-01NT41229 awarded by the U.S. Department of Energy. The government has certain rights in the invention.

BACKGROUND OF INVENTION

The present invention relates to the field of triggering synchronized actions in downhole environments, such as along a drill string used in oil and gas exploration, or along the casings used in production wells and other equipment used in oil and gas production.

Triggering a seismic source and simultaneously collecting data has been expressed for more than half a century. The precise relationship between the time the seismic source triggers and the time the seismic receivers collect data may be useful in determining subterranean formations and thereby improve oil, gas, and geothermal well exploration and production. For example, to determine the subterranean formations surrounding a well bore, it may be beneficial to record seismic data synchronously with the triggering of a seismic source. Also, it may be useful to trigger multiple seismic sources synchronously. Several methods and systems to take such measurements, and correlate the times of triggering two actions are known in the art. In the downhole environment, systems and methods have been developed that have direct communication by wire or through fluid to the downhole device, and trigger a downhole device according to instructions received via these methods.

One example of such systems is described in U.S. Pat. No. 6,624,759 to Tubel, et al., which discloses a communication system that enables communication from a surface location to a downhole location where instructions communicated are executed. The system employs accelerometers to sense vibrations traveling within the annulus fluid or the tubing string. The accelerators provide signals representative of the vibration generated at the surface of the well to a microcontroller. The microcontroller is programmed to energize a nichrome element to actuate the downhole tool in response to a user-defined vibration sequence. The vibration sequence includes a defined number of vibration cycles. Each cycle includes alternating periods of vibration and no vibrations with each period lasting for a defined length of time. The user may program the parameters of the sequence and arm the vibration receiving unit on site through a handheld terminal that interfaces with the microcontroller.

Several systems for actuating or triggering downhole tools are described in U.S. Pat. Nos. 6,349,766; 5,558,153; and 4,471,435 and describe a variety of non-electrical methods to trigger a downhole tool. These methods include placing a chemical sensor downhole and introducing a chemical slug into fluids being pumped downhole, or using a burst of neutrons downhole to trigger a downhole tool.

U.S. Pat. No. 6,386,108 to Brooks, et al. discloses the initiation of one or more explosive devices. In response to activation of a trigger signal down the electrical cable, a switch coupling the energy source and an initiator is closed to couple the energy source to the initiator.

A system that may be used to trigger downhole actions is disclosed in U.S. Pat. No. 6,670,880 to Hall, et al. which discloses a system for transmitting data through a string of downhole components. In one aspect, the system includes first and second magnetically conductive, electrically insulating elements at both ends of the component. Each element includes a first U-shaped trough with a bottom, first and second sides and an opening between the two sides. An electrically conducting coil is located in each trough. An electrical conductor connects the coils in each component. In operation, a varying current applied to a first coil in one component generates a varying magnetic field in the first magnetically conductive, electrically insulating element, which varying magnetic field is conducted to and thereby produces a varying magnetic field in the second magnetically conductive, electrically insulating element of a connected component, which magnetic field thereby generates a varying electrical current in the second coil in the connected component.

SUMMARY OF INVENTION

A method for triggering an action of at least one downhole device on a downhole network integrated into a downhole tool string synchronized to an event comprises determining latency, sending a latency adjusted signal, and performing the action. The latency is determined between a control device and the at least one downhole device. The latency adjusted signal is sent to the downhole device for triggering an action. The action is performed downhole synchronized to the event. Disclosed is a method for determining latency consisting of the steps: a control device sends a signal to the downhole device; after receiving the signal, the downhole device sends a response signal to the control device; and the control device performs a logical analysis of the time from sending the signal to receiving the response signal.

It should be noted that the terms "triggering signal" and "latency adjusted signal" refer to different aspects of the same signal. The term "triggering signal" is used when referring to the purpose of the signal. The term "latency adjusted signal" is used when referring to the timing of the signal. In general these terms refer to a signal that has been adjusted for latency and is intended to trigger an action of a downhole device.

It should also be noted that the term "latency" is intended to have a relatively broad meaning. "Computational latency" refers to the amount of time from when an instruction is received until it has been processed (e.g. the time elapsed between receiving a request for information and transmitting said information). "Transmission latency" refers to the amount of time it takes for an electrical pulse to travel between two devices over a downhole network integrated into a downhole tool string. "Total signal latency" refers to a combination of computational latency and transmission latency. Generally, the term "latency" refers to total signal latency.

Preferably hardware is designed such that the time between the downhole device receiving the signal and sending the response signal is a known constant. The method of determining latency may be done multiple times, and the results may be analyzed to find an average latency. In the preferred embodiment the control device is a computer. The control device may comprise a connection to a local area network. The control device may comprise a clock source. The clock source may be selected from the group consisting of at least one crystal, at least one transistor, at least one oscillator, at least one RC circuit, at least one LC circuit, and at least one RLC circuit.

In the preferred embodiment the control device communicates with multiple downhole devices via one electrically conducting media, the latency between each device and the control device is determined by the control device, and the control device sends triggering signals to each device. In an alternate embodiment the control device communicates with the downhole devices via separate electrically conducting medium.

In the preferred embodiment each downhole device comprises a local clock source. The clock source may be selected from the group consisting of at least one crystal, at least one transistor, at least one oscillator, at least one RC circuit, at least one LC circuit, and at least one RLC circuit. The clock source of each downhole device may be synchronized to the clock source of the control device. In the preferred embodiment, one triggering signal is sent to all the downhole devices, with a portion of the signal designated for and used by each device. In an alternate embodiment, separate triggering signals are sent to each downhole device.

Also disclosed is a downhole device that performs the action at the moment the triggering signal is received. Alternately, the downhole device performs the action some delay after receiving the signal, where the delay may be relative to a local clock source. Disclosed is a triggering signal which contains instructions to the downhole devices to trigger at a specified time of day.

Preferably, the downhole devices perform actions after a delay relative to a local clock source. The downhole devices may perform different actions. The event may be performed by the control device, a clock, surface equipment, or another downhole device. In some embodiments, the downhole devices are selected from the group consisting of sensors, motors, jars, seismic sources, seismic receivers, steering elements, hammers, and repeaters. The actions may be selected from the group consisting of data acquisition, mechanical operations and electrical operations. The mechanical operations may be the actuation of a hammer, a jar, or another seismic source. The electrical operations may be the recording of data, the start of an electrical motor, or the initiation of a repeater. An example of the synchronous triggering of multiple devices may be a seismic source that is triggered synchronously with the recording of data from a number of seismic receivers. The time between the beginning of the recording and the reception of seismic energy may then be analyzed to determine subterranean formations. In an alternate embodiment, the intermediate downhole devices perform actions after a delay relative to a local clock source, and the final downhole device performs an action at the moment the triggering signal is received.

BRIEF DESCRIPTION OF DRAWINGS

FIG. 4 is a block diagram of an embodiment of a control device in communication with one downhole device.

FIG. 5 is a block diagram of an embodiment of a control device in communication with downhole devices.

FIG. 6 is a block diagram of an embodiment of a signal configuration.

FIG. 7 is a block diagram of an embodiment of a signal configuration.

DETAILED DESCRIPTION

Figure 1:
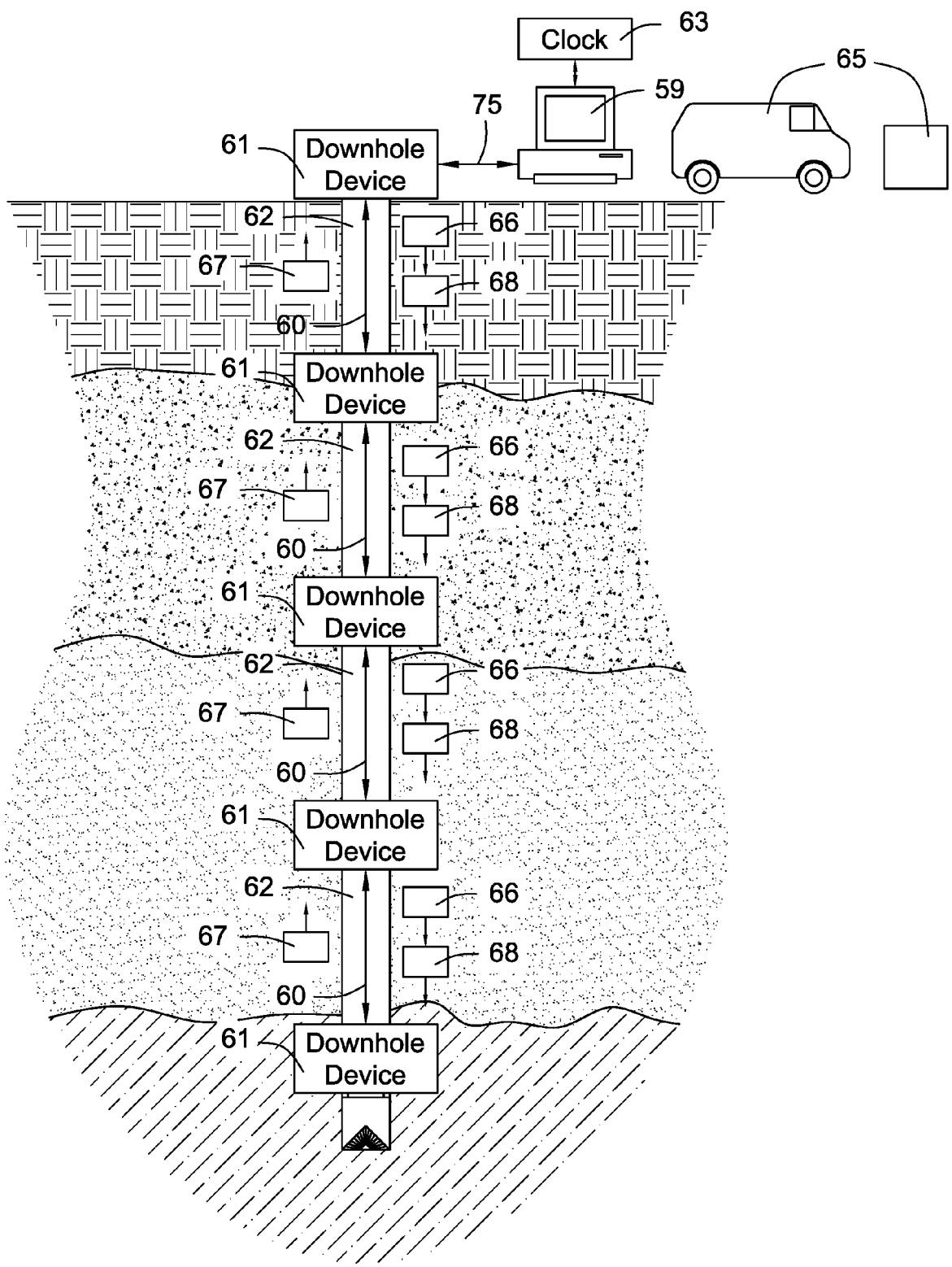
FIG. 1 is a block diagram of an embodiment of an integrated downhole network in a downhole tool string.

FIG. 1 shows an embodiment of the integrated downhole network 60 in a downhole tool string 62 with multiple downhole devices 61. The control device 59 is connected 75 to a downhole network 60 integrated into a downhole tool string 62. Total signal latency of a signal 66 traveling between the control device 59 and each downhole device 61 connected to the downhole network 60 may vary based on the transmission latency of the downhole network 60. The total signal latency may be affected by electrical connectors in the network 60, the time for devices 61 to process signals, the number of intermediate repeaters in the network 60, or the length of the signal 66. Total signal latencies between the control device 59 and each downhole device 61 are determined by the control device 59. The total signal latency to each downhole device 61 is determined by the control device 59 sending to each downhole device 61 a first signal 66. After receiving the first signal 66, each downhole device 61 sends to the control device 59 a response signal 67. The control device 59 measures the time between sending the first signal 66 and receiving the response signal 67. The control device 59 performs logical analysis on the measurement to determine latency. The control device 59 then sends a latency adjusted signal 68 to each downhole device 61. Each downhole device 61 triggers an action synchronized to an event which may be performed by the control device 59, a clock 63, surface equipment 65, or another downhole device 61. The clock 63 may be part of the control device 59. Alternately, the clock 63 may be external, such as a GPS clock or a system clock. The clock 63 may be synchronized to a GPS clock. Generally, the integrated downhole network 60 comprises one or more components integrated into a downhole tool string 62. Preferably the components comprise first and second communication elements proximate both ends of the component and an electrical conductor which connects the elements. The communication elements may be made of magnetically conductive and electrically insulating material, such as ferrite. Alternatively, the communication elements may comprise electrical contacts.

Figure 2:
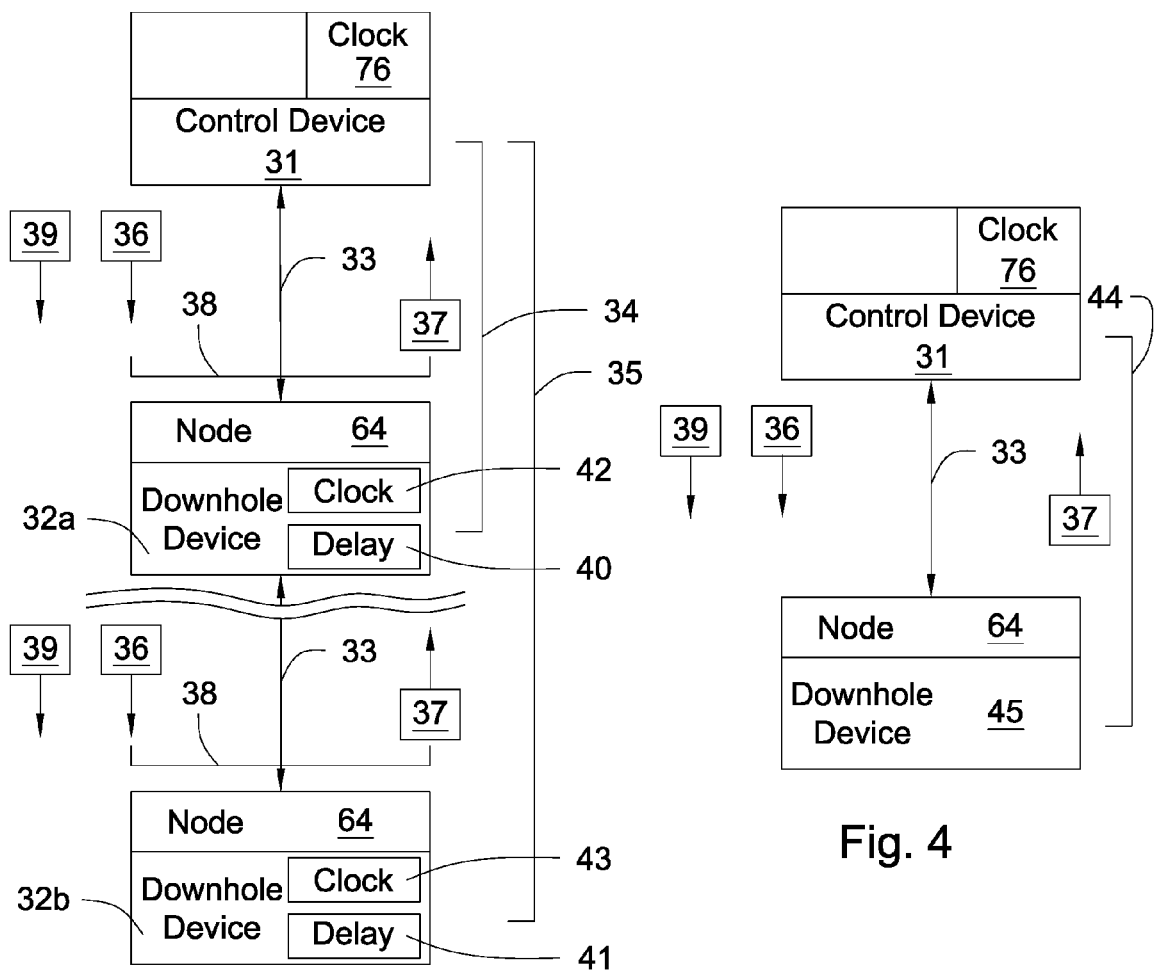
FIG. 2 is a block diagram of an embodiment of a control device in communication with two downhole devices.

FIG. 2 represents our preferred embodiment. The preferred embodiment has a control device 31. This control device 31 is preferably a computer. The control device 31 may comprise a connection to a local area network. The control device 31 is preferably in communication with multiple downhole devices 32a, 32b via one electrically conducting media 33. The nodes 64 shown here and in the following drawings may be as complex as discussed in U.S. patent application Ser. No. 60/481225, entitled "Distributed Downhole Drilling Network," and filed Aug. 13, 2003 in the name of David Hall, et. al. The nodes 64 may alternately be as simple as a network interface modem or control logic for interfacing with a network.

The total signal latencies 34, 35 between the control device 31 and individual downhole devices 32a, 32b may be determined by the control device 31. In the preferred embodiment, the latencies 34, 35 are determined by the control device 31 sending to the downhole device 32a, 32b a first signal 36, and after receiving the first signal 36, each downhole device 32*a*, 32*b* sends to the control device 31 a response signal 37. Preferably, the control device 31 measures the time between sending the first signal 36 and receiving the response signal 37 to determine a time required. This measurement may be obtained multiple times, and an average may be taken to determine an average time required. Preferably, hardware in each downhole device 32*a*, 32*b* is designed such that the computational latency 38 between the downhole device 32 receiving the first signal 36 and sending the response signal 37 is a known constant.

The control device 31 may perform logical analysis on the measurement to determine latency. The control device 31 may subtract the computational latency 38 between the downhole devices 32*a*, 32*b* receiving the first signal 36 and sending the response signal 37 from the time required or the average time required. The control device may also divide time required or average time required by two to get a time for the first signal 36 to reach the downhole device 32*a*, 32*b*. The control device 31 then sends a latency adjusted signal 39 to each downhole device 32*a*, 32*b*.

Preferably each downhole device 32*a*, 32*b* triggers an action after some delay 40, 41 relative to a local clock source 42, 43 and synchronously with another event which may be performed by the control device 31, a clock 76, surface equipment 65 (in FIG. 1), or another downhole device 32*a*, 32*b*. The downhole devices 32*a*, 32*b* may be selected from the group consisting of sensors, motors, jars, seismic sources, seismic receivers, steering elements, hammers, and repeaters. The local clock source 42, 43 may be synchronized to the clock source 76 of the control device 31. The clock sources 42, 43, 76 may be selected from the group consisting of at least one crystal, at least one transistor, at least one oscillator, at least one RC circuit, at least one LC circuit, and at least one RLC circuit. The local clock source 42, 43 may be synchronized to the clock source 76 of the control device 31. The actions may be selected from the group consisting of data acquisition, mechanical operations and electrical operations. The mechanical operations may be the actuation of a hammer, a jar, or another seismic source. The electrical operations may be the recording of data, the start of an electrical motor, or the initiation of a repeater. An example of the synchronous triggering of multiple devices may be a seismic source that is triggered synchronously with the recording of data from a number of seismic receivers. The time between the beginning of the recording and the reception of seismic energy may then be analyzed to determine subterranean formations. The downhole devices 32*a*, 32*b* may perform different actions. The actions may be performed at a specified time of day. Alternatively, some devices may have no delay 41, 40, but will trigger as soon as the signal reaches the device 41, 40.

For example, the delays 40 of the other downhole devices 32*a* may be adjusted to trigger at the moment the last downhole device 32*b* receives the latency adjusted signal 39, and the last downhole device 32*b* may have no delay 41 and trigger at the moment it receives the latency adjusted signal 39. This may result in all the downhole devices 32*a*, 32*b* triggering at the same moment, which may be synchronized with another event.

Figure 3:
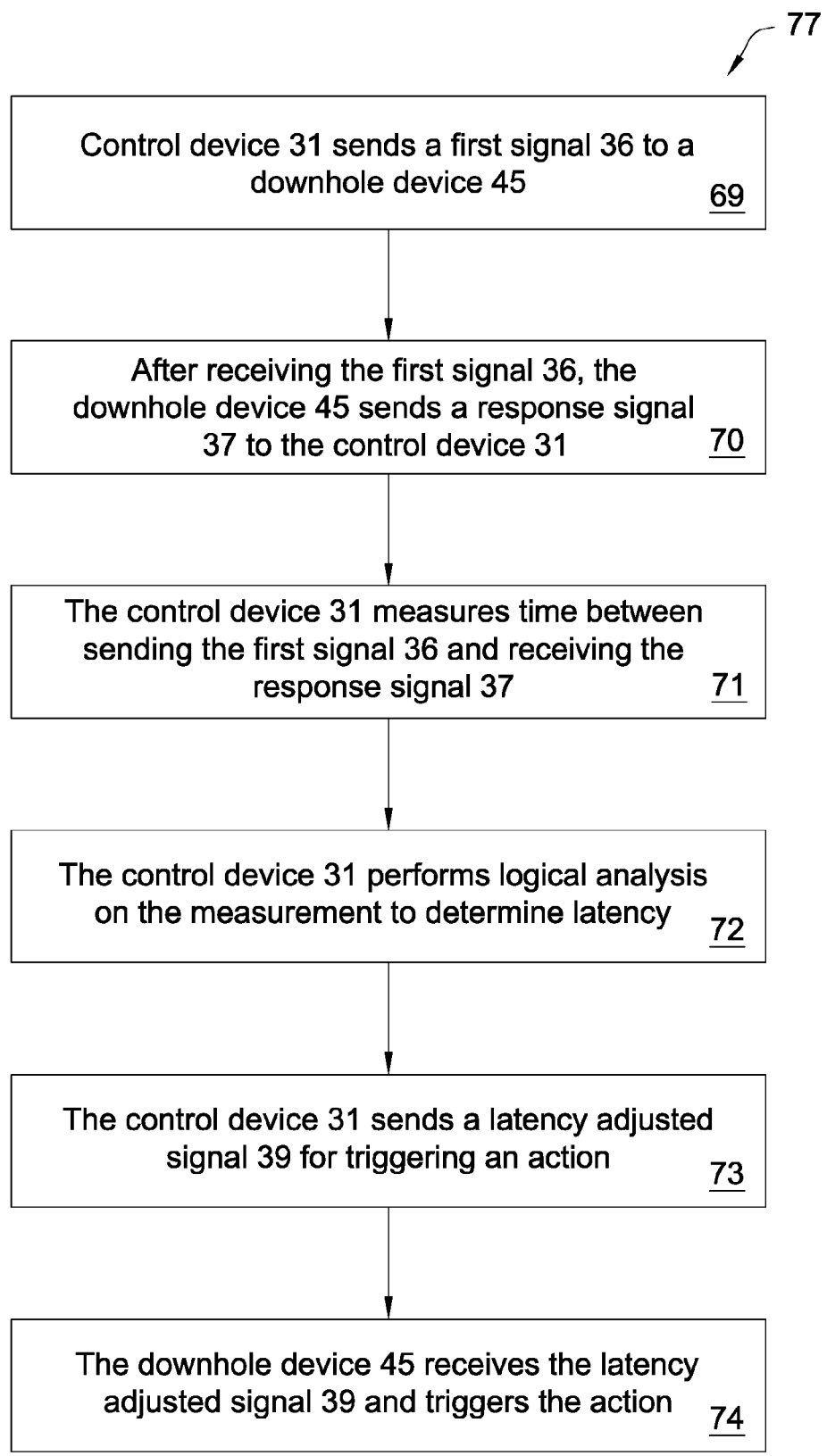
FIG. 3 is a flow chart of an embodiment of a method for triggering an action.

FIG. 3 illustrates an embodiment of a method 77 for triggering an action of a down-hole device 45 synchronized to an event, and references FIG. 4 and FIG. 2. Step 69 comprises a control device 31 sending a first signal 36 to a down-hole device 45. Step 70 after receiving the first signal 36, the downhole device 45 sends a response signal 37 to the control device 31. Preferably, hardware is designed so that the time 38 between the downhole device receiving the first signal 36 and sending the response signal 37 is a known constant. Step 71 determines the time between the control device 31 sending the first signal 36 and receiving the response signal 37. Step 72 determines the time for the first signal 36 to reach the downhole device 45 using the time measured in step 71. The time for the first signal 36 to reach the downhole device 45 is preferably computed using logical analysis. The logical analysis may be performed by assuming the total signal latency from the control device 31 to the downhole device 45 is equal to the total signal latency from the downhole device 45 to the control device 31 and dividing the time measured by two. In step 73 the control device 31 sends a latency adjusted signal 39 for triggering an action. In the final step 74 the down-hole device 45 receives the latency adjusted signal 39 and performs the action. In the embodiment shown in FIG. 4, the action is performed at the moment the latency adjusted signal 39 is received. Preferably, the action is performed after a specified delay 40, 41 relative to a local clock source. The delay 40, 41 may be different for each downhole device 45, 32*a*, 32*b*. The local clock source may be synchronized to the clock source 76 of the control device 31. Alternately, the action is performed at a specified time of day.

FIG. 4 shows an alternate embodiment. In this embodiment, a control device 31 is in communication with one downhole device 45 via one electrically conducting media 33. The time 44 required for a signal 36 to travel between the control device 31 and the downhole device 45 is determined by the control device 31. The control device 31 then sends a latency adjusted signal 39 to the downhole device 45. The downhole device 45 triggers the action at the moment it receives the latency adjusted signal 39. The downhole device may also comprise a local clock source, and may trigger the action after a delay, or at a specific time of day. The local clock source may be synchronized to the clock source 76 of the control device 31.

FIG. 5 shows an embodiment of a control device 31 in communication with multiple downhole devices 46, 47 via multiple electrically conducting medium 48, 49 and may be in communication via nodes 64. The times 50, 51 required for a signal to travel between the control device 31 and the downhole devices 46, 47 are determined by the control device 31. The control device 31 then sends separate latency adjusted signals 52, 53 to the downhole device 46, 47. The latency adjusted signals 52, 53 may be sent simultaneously or at different moments in time. The downhole devices 46, 47 trigger the actions at the moment the adjusted signal 52, 53 is received. In this embodiment, the adjusted signal 52, 53 is sent to each downhole device 46, 47 so that the adjusted signal 52, 53 is received by each downhole device 46, 47 simultaneously, and may occur synchronously with another event. The downhole devices 46, 47 may also comprise a local clock source and may trigger after a delay, or at a specific time of day. The local clock source may be synchronized to the clock source 76 of the control device 31.

FIG. 6 shows an embodiment of a configuration of the latency adjusted signal 39 for the triggering of two downhole devices, and references FIG. 2. In this embodiment, the signal 54 is a packet of information. The packet 54 comprises a field 57, 58 for each downhole device 32*a*, 32*b*. Each downhole device 32*a*, 32*b* receives the same packet 54, and reads the designated field 57, 58. The number of fields may be equal to the number of downhole devices.

FIG. 7 shows an embodiment of a configuration of the adjusted signal 39 for the triggering of two downhole devices, and references FIG. 2. Separate signals 55, 56 are sent to each downhole device 32a, 32b. For a network that communicates via one electrically conducting media 33 such as in FIG. 2, the signals may be sent consecutively, and may not overlap in time. Interference between the two signals may result if the second signal is started before the first signal has ended. For a network that communicates via multiple electrically conducting media 48, 49 such as in FIG. 5, the signals may be sent simultaneously.

Whereas the present invention has been described in particular relation to the drawings attached hereto, it should be understood that other and further modifications apart from those shown or suggested herein, may be made within the scope and spirit of the present invention.

The invention claimed is:

1. A method for triggering an action of at least one downhole device in a downhole network integrated into a downhole tool string synchronized to an event comprising:
   determining latency between a control device and the at least one downhole device;
   sending to the downhole device a latency adjusted signal for triggering the action, and
   performing the action downhole synchronized to the event.

2. The method of claim 1 wherein the event is performed by the control device, a clock, surface equipment, or another downhole device.

3. The method of claim 1 wherein the latency to each downhole device is determined through logical analysis of measurements obtained by measuring the time between sending a first signal to the downhole device and receiving a response signal from the downhole device.

4. The method of claim 3 wherein time between the downhole device receiving the first signal and sending the response signal is a known constant.

5. The method of claim 3 wherein the measurements are performed multiple times.

6. The method of claim 1 wherein the control device is a computer.

7. The method of claim 1 wherein the control device comprises a connection to a local area network.

8. The method of claim 1 wherein the control device comprises a clock source.

9. The method of claim 8 wherein the clock source is selected from the group consisting of at least one crystal, at least one transistor, at least one oscillator, at least one RC circuit, at least one LC circuit, and at least one RLC circuit.

10. The method of claim 1 wherein the downhole device comprises multiple downhole devices.

11. The method of claim 1 wherein the downhole devices are selected from the group consisting of sensors, motors, jars, seismic sources, seismic receivers, steering elements, hammers, and repeaters.

12. The method of claim 10 wherein the downhole devices communicate with the control device via multiple electrically conducting medium.

13. The method of claim 1 wherein each downhole device comprises a local clock source.

14. The method of claim 13 wherein the clock source of each downhole device is synchronized with the clock source of the control device.

15. The method of claim 1 wherein the control device sends a single signal to multiple downhole devices.

16. The method of claim 1 wherein the control device sends a separate signal to each downhole device.

17. The method of claim 1 wherein the actions are selected from the group consisting of data acquisition, mechanical operations and electrical operations.

18. The method of claim 1 wherein the downhole devices perform different actions.

19. The method of claim 1 wherein the action is triggered at the moment the downhole device receives the signal.

20. The method of claim 1 wherein the action of the downhole device is triggered at a specified delay after receiving the signal.

21. The method of claim 1 wherein the action is performed at a specified time of day.

22. A method for triggering an action of multiple downhole devices on a downhole network integrated into a downhole tool string synchronized to an event comprising:
   measuring time between a computer sending a first signal to the downhole device and receiving a response signal from the downhole device,
   performing a logical computation on the measurements to determine the latency, sending to the downhole device a latency adjusted signal for triggering the action, and performing the action downhole synchronized to the event.

23. The method of claim 22 wherein the event is selected from the group consisting of an action of the computer, a moment in time, the variation of a clock, an action of another downhole device, an action of another device.

24. The method of claim 22 wherein time between the downhole device receiving the first signal and sending the response signal is a known constant.

25. The method of claim 22 wherein the measurements are performed multiple times.

26. The method of claim 22 wherein the computer is connected to a local area network.

27. The method of claim 22 wherein the clock of the computer is synchronized to a GPS clock.

28. The method of claim 22 wherein the downhole devices are selected from the group consisting of sensors, motors, jars, seismic sources, seismic receivers, steering elements, hammers, and repeaters.

29. The method of claim 22 wherein each downhole device comprises a local clock source.

30. The method of claim 29 wherein the clock source of each downhole device is synchronized with the clock source of the control device.

31. The method of claim 22 wherein the computer sends a single signal to multiple downhole devices.

32. The method of claim 22 wherein the computer sends a separate signal to each downhole device.

33. The method of claim 22 wherein the actions are selected from the group consisting of data acquisition, mechanical operations and electrical operations.

34. The method of claim 22 wherein the downhole devices perform different actions.

35. The method of claim 22 wherein the action of the downhole device is triggered at a specified delay after receiving the signal.

36. The method of claim 22 wherein the action is performed at a specified time of day.

* * * * *